United States Patent [19]

Winstead

[11] 4,359,338

[45] Nov. 16, 1982

[54] COATING COMPOSITION ADAPTED FOR ELECTRIC GENERATORS

[75] Inventor: Maynard R. Winstead, West Peabody, Mass.

[73] Assignee: General Electric Company, Schenectady, N.Y.

[21] Appl. No.: 254,787

[22] Filed: Apr. 16, 1981

[51] Int. Cl.³ .......................... C09D 3/64; C09D 5/08
[52] U.S. Cl. ............................. 106/14.13; 106/14.24; 106/14.36; 106/253; 106/264; 428/458
[58] Field of Search ........... 260/22 CA, 22 A, 29.2 E; 428/458; 106/14.13, 14.14, 14.24, 14.36

[56] References Cited

U.S. PATENT DOCUMENTS

| 2,739,902 | 3/1956 | Mack et al. | 260/22 CA |
| 2,858,285 | 10/1958 | Johnson | 106/14.36 |
| 3,260,609 | 7/1966 | Reeser | 260/22 A |
| 3,446,763 | 5/1969 | Okuzumi | 260/22 CA |
| 3,661,858 | 5/1972 | Gleim et al. | 260/22 CA |
| 4,004,063 | 1/1977 | Peterson et al. | 260/29.2 E |
| 4,049,596 | 9/1977 | Traister et al. | 260/22 A |
| 4,056,495 | 11/1977 | Kawamura et al. | 428/458 |

FOREIGN PATENT DOCUMENTS 731214 3/1966 Canada ............................. 260/22 A

OTHER PUBLICATIONS

Noller, Chemistry of Organic Compounds, W. B. Saunders Company, Philadelphia, Pa., 1951, p. 596.

*Primary Examiner*—Ronald W. Griffin
*Attorney, Agent, or Firm*—Hedman, Casella, Gibson & Costigan

[57] ABSTRACT

A single package, air dry waterborne primer system which contains limited amounts of trace elements and offers corrosion resistance.

9 Claims, No Drawings

COATING COMPOSITION ADAPTED FOR ELECTRIC GENERATORS

This invention relates to a single package air dry waterborne primer system with particular application in coating both the interior and exterior walls of steam turbine steel generators.

BACKGROUND OF THE INVENTION

A number of coatings are known in this art. These coatings have been developed with different colors, varying degrees of corrosion resistance and relatively high amounts of trace elements which when in contact with the reactive steam, can affect the efficiency of the nuclear reaction.

Each generator normally receives two to three coats of primer prior to shipment to the plant site. Upon arrival at the plant site, generators are thereafter commonly stored outside without any further protection, typically for a period of time from three months to three years. During that time, rain and/or humidity cause present coatings to lose their intercoat adhesion and eventually cause the coatings to lose their adhesion to the substrate, which results in loss of corrosion protection. It is one purpose of this invention to provide extended corrosion protection in a primer.

The steam turbine generator industry requirement of a minimum of 200 hours salt fog resistance has not previously been met. Corrosion resistance is vital, in that any corrosion prior to installation requires expensive in-field refinishing, and extensive corrosion significantly shortens the service life of the generators. It is another purpose of this invention to provide a primer which meets the industry requirement of a minimum of 200 hours salt fog resistance.

Coatings known in the art prior to this invention have also failed to provide a primer with acceptable amounts of trace elements so as to avoid contamination of the reactive steam. The acceptable limits set by the industry on trace elements which have not previously been met are as follows:

| ELEMENT | PARTS PER MILLION BY WEIGHT OF WET PAINT |
|---|---|
| Chlorine | 100 |
| Cobalt | 200 |
| Fluorine | 200 |
| Lead | 50 |
| Sulfur | 250 |

Any greater amounts of trace elements in the primer coating the interior of the generators have been found to adversely affect the nuclear reaction, for the reactive steam which is circulated through the nuclear reactor comes in direct contact with the primer inside the generator. It is another purpose of this invention to provide a primer which contains limited trace elements within the acceptable industry limits.

One embodiment of the instant invention meets and exceeds all industry requirements described above in a single air dry waterborne system. Previously, two primers were needed, one for coating the exterior of the generator offering corrosion resistance, the other for coating the interior of the generator, which contained unacceptable amounts of trace elements.

Prior to this invention, no single product applicable on both the interior and exterior walls of the generators had been developed that met the industry standard and requirement of both environmental protection and limited trace element contamination. It is a primary purpose of this invention to provide such a single product to meet both industry requirements.

DESCRIPTION OF THE INVENTION

There are two embodiments of the present invention which meet the industry requirements for a single product generator coating. In the first embodiment, the coating composition comprises an alkyd resin solution, pigments, water, and a combination of certain driers. In addition, the composition is formulated as to contain less than above-specified amounts of trace elements. In order to meet the exposure requirements of the industry, we have found it essential to use a combination of driers which contain manganese, calcium and zirconium driers. Elimination of any of these three driers will adversely affect the corrosion and exposure resistance of the finished coating. In more detail, these driers usually comprise a carboxylic salt of the metal in a solvent, such as mineral spirits, with the aid of any of the well known dispersing agents. Generally, such a drier comprises from 40 to 60 parts metal carboxylate salt per 100 parts drier, 10 to 15 parts dispersing agent per 100 parts drier, the remainder of the drier being the solvent.

According to the second embodiment of the invention, the composition comprises an alkyd resin solution, conventional pigments, driers, water and a special pigment adapted to improve the corrosion resistance of the final coating. This special pigment is barium metaborate ($BaB_2O_4 \cdot H_2O$) which has been specially treated so as to provide a low concentration of free barium ions in the final system. Without this treatment, the free barium ions present in the commercial barium metaborate pigments are incompatible with the alkyd resin component of the system. This special treatment involves adding ammonium carbonate to the system which reacts with the free barium ions to form barium carbonate. The barium carbonate is not soluble in the water solution and will not provide sufficient free barium ions to effect the stability of the system. Preferably, the ammonium carbonate is added to the system prior to the addition of the barium metaborate, since on mixing the alkyd resin solution with barium metaborate containing free barium ions, the free barium ions cause the resin to gel or precipitate from solution. By means of this special treatment, the amount of barium metaborate in the system can be increased so as to improve the corrosion resistance of the final coating. Practical amounts to use, therefore, can vary from as low as 1% to as high as 15% of the total composition.

Less desirably, the free barium ions can be removed from the system by using other water-soluble carbonate salts such as sodium or potassium carbonate.

In the second embodiment of the invention, the combination of driers present in the first embodiment can also be used to advantage to increase the corrosion and exposure resistance of the final coating. In addition, the composition is desirably formulated so as to contain less than the previously specified amounts of trace elements.

According to either embodiment of the invention, the shelf-life of the system can be improved by adding 1,10-phenanthroline to the system. The presence of this chemical maintains the effectiveness of the combination of driers on long term storage.

The alkyd resin component of the system is the same in either embodiment. It can be any of the conventional glyceryl-phthalate resins modified with unsaturated fatty acids as are well known in the art. In making such alkyd resins, any of the well known drying oil acids, such as linseed oil, may be employed. It is important that the alkyd resin be water-dispersible, and for this purpose, the alkyd resin is manufactured with free carboxyl groups, which are then neutralized with a tertiary amine of ammonium hydroxide.

The pigments useful in either embodiment of the invention, other than the specially treated barium metaborate, can be selected for their desired properties of color, covering power, etc. and preferably will be substantially free of the abovementioned trace elements. Suitable pigments include lampblack, magnesium silicate, calcium carbonate, iron oxide red, iron oxide yellow, titanium dioxide, and the like.

The following examples will serve to illustrate the invention:

EXAMPLE 1

A coating composition is prepared by pre-mixing the following:
Alkyd resin 4702 Solution: 11.98 parts
Ethylene Glycol Monobutyl Ether: 2.47 parts
Manganese Hydrocure: 0.24 parts
Ammonium Hydroxide: 0.58 parts
Water: 24.0 parts
Defoamer Troykyd 333: 0.26 parts
Methyl Ethyl Ketoxime: 0.04 parts
Anti-terra P: 0.76 parts
To the premix is added the following:
Magnesium Silicate 599: 6.75 parts
Yellow Oxide: 0.67 parts
Calcium Carbonate: 7.42 parts
Magnesium Silicate 300: 5.23 parts
Lampblack: 0.04 parts
Titanium Dioxide: 6.18 parts
Iron Oxide, Red: 0.10 parts The mixture is then run through a Hegman grind sandmill for 6½ minutes. Then the following is mixed off:
Water: 2.47 parts
Ammonium Hydroxide: 0.57 parts
Water: 7.13 parts
Alkyd Resin 4702: 11.98 parts
1,10-phenanthroline: 0.10 parts
Zirconium Hydrocem: 0.15 parts
Calcium Hydrocem: 0.36 parts
Methyl Ethyl Ketoxime: 0.04 parts
Ethylene Glycol Monobutyl Ether: 2.47 parts
Water: 8.01 parts

EXAMPLE 2

A coating composition is prepared by first pre-mixing water, 1.0 parts, and ammonium carbonate, 0.40 parts. Then the following is pre-mixed:
Alkyd 4702: 12.02 parts
Ethylene Glycol Monobutyl Ether: 2.46 parts
Manganese drier: 0.25 parts
Ammonium Hydroxide: 0.50 parts
Water-Ammonium Carbonate Pre-mix: 1.40 parts
Water: 23.0 parts
Defoamer: 0.27 parts
Methyl Ethyl Ketoxime: 0.02 parts
Anti-Terra P: 0.79 parts
To the pre-mix is added the following:
Magnesium Silicate 599: 6.8 parts
Yellow Oxide: 0.69 parts
Calcium Carbonate: 2.46 parts
Magnesium Silicate 300: 5.22 parts
Lampblack: 0.05 parts
Titanium Dioxide: 6.21 parts
Iron Oxide, Red: 0.10 parts
Barium Metaborate: 4.93 parts The mixture is then run through a Hegman grind sandmill for 6½ minutes. Then the following is mixed off:
Water: 2.47 parts
Ammonium Hydroxide: 0.49 parts
Water: 7.13 parts
Alkyd Resin 4702: 12.02 parts
1,10-phenanthroline: 0.10 parts
Zirconium Hydrocem: 0.16 parts
Calcium Hydrocem: 0.36 parts
Methyl Ethyl Ketoxime: 0.02 parts
Ethylene Glycol Monobutyl Ether: 2.46 parts
Water: 7.62 parts The two formulations, one with barium metaborate and ammonium carbonate (Example 2), the other (Example 1) without, were tested on cold rolled steel panels at 2 mils dry film thickness and air dried for 7 days at approximately 77° F. The characteristics of the two embodiments of the invention, are as follows:

|  | Example 1 | Example 2 |
|---|---|---|
| Wet Film Properties |  |  |
| 30 day heatage at 120° F. | passed | passed |
| Chlorine, ppm | 100 | 100 |
| Cobalt, ppm | 200 | 200 |
| Fluorine, ppm | 200 | 200 |
| Lead, ppm | 50 | 50 |
| Sulfur, ppm | 250 | 250 |
| Closed Cup Flash, degrees | 140+ | 140+ |
| Dry Film Properties |  |  |
| 100% relative humidity, hrs. | 400+ | 400+ |
| Salt Fog, hrs. | 250 | 250 |
| Adhesion, cross hatch, tape | 100% | 100% |
| Hard through dry, hrs. | 72 | 72 |
| Rain cycles, 5 | passed | passed |
| Recoat time, hrs. | 2 | 2 |

It will be seen that both embodiments of the invention fulfill the requirements of the industry for corrosion resistance and minimum content of trace elements, but that composition B, containing the specially treated barium metaborate, has much improved corrosion resistance, as measured by the salt fog test.

All of the foregoing patents and/or publications are incorporated herein by reference. It is obvious that many variations are possible in light of the above detailed descriptions. For example, other alkyd resin compositions may be used. All such variations are within the full intended scope of the appended claims.

I claim:
1. An air-drying coating composition adapted to provide corrosion-resistant coatings relatively free of certain trace elements which comprises:
    (a) an alkyd resin solution;
    (b) pigments;
    (c) calcium drier;
    (d) zirconium drier;
    (e) manganese drier; and

(f) water said composition containing not more than the following amounts of trace elements per million parts of the coating composition:

chlorine: φparts
cobalt: 200 parts
fluorine: 200 parts
lead: 50 parts
sulfur: 250 parts.

2. A composition as defined in claim 1 which additionally contains 1,10-phenanthroline.

3. An air-drying coating composition adapted to provide corrosion-resistant coatings relatively free of certain trace elements which comprises:
(a) an alkyd resin solution;
(b) barium metaborate pigment;
(c) other pigments;
(d) calcium drier;
(e) zirconium drier;
(f) manganese drier; and
(g) water said composition containing less than the following amounts of trace elements per million parts of the coating composition:

chlorine: 100 parts
cobalt: 200 parts
fluorine: 200 parts
lead: 50 parts
sulfur: 250 parts.

4. A composition as defined in claim 3 which is relatively free of free barium ions.

5. A composition as claimed in claim 3 which additionally contains 1,10-phenanthroline.

6. An air-drying coating composition adapted to provide corrosion-resistant coatings relatively free of certain trace elements consisting essentially of:
(a) an alkyd resin solution;
(b) barium metaborate pigment;
(c) other pigments;
(d) calcium drier;
(e) zirconium drier;
(f) manganese drier; and
(g) water, said composition containing less than the following amounts of trace elements per million parts of the coating composition:

chlorine: 100 parts
cobalt: 200 parts
fluorine: 200 parts
lead: 50 parts
sulfur: 250 parts.

7. Process for forming an air-drying coating composition adapted to provide corrosion-resistant coatings relatively free of free barium ions comprising:
admixing
(a) an alkyd resin solution;
(b) barium metaborate pigment
(c) other pigments;
(d) driers;
(e) water;
(f) water-soluble carbonate salt, and precipitating any free barium ions as barium carbonate.

8. Process as claimed in claim 7 in which the water-soluble carbonate salt is ammonium carbonate.

9. A process as recited in claim 7 wherein said water-soluble carbonate salt is ammonium carbonate, added in an amount sufficient to precipitate any free barium ions as barium carbonate.

* * * * *

UNITED STATES PATENT AND TRADEMARK OFFICE
CERTIFICATE OF CORRECTION

PATENT NO. : 4,359,338

DATED : November 16, 1982

INVENTOR(S) : Maynard R. Winstead

It is certified that error appears in the above-identified patent and that said Letters Patent is hereby corrected as shown below:

Please correct the above-identified patent as follows:

Column 5, line 5, "chlorine: ∅ parts" should read --chlorine: 100 parts--.

Signed and Sealed this

Twenty-second Day of February 1983

[SEAL]

Attest:

Attesting Officer

GERALD J. MOSSINGHOFF

Commissioner of Patents and Trademarks